US011988355B2

(12) United States Patent
Studeny et al.

(10) Patent No.: US 11,988,355 B2
(45) Date of Patent: May 21, 2024

(54) LIGHT MODULE FOR A LIGHTING DEVICE OF A VEHICLE AND METHOD FOR REDUCING A COLOR DESATURATION IN A LIGHT MODULE FOR A LIGHTING DEVICE OF A VEHICLE

(71) Applicant: Volkswagen Aktiengesellschaft, Wolfsburg (DE)

(72) Inventors: Christian Studeny, Schöppenstedt (DE); Helge Holtorf, Königslutter (DE); Bernhard Kreipe, Hannover (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 0 days.

(21) Appl. No.: 17/856,350

(22) Filed: Jul. 1, 2022

(65) Prior Publication Data

US 2023/0003360 A1 Jan. 5, 2023

(30) Foreign Application Priority Data

Jul. 1, 2021 (EP) .................................... 21183052

(51) Int. Cl.
*F21S 43/31* (2018.01)
*F21S 43/239* (2018.01)
(Continued)

(52) U.S. Cl.
CPC ............. *F21S 43/31* (2018.01); *F21S 43/239* (2018.01); *F21S 43/33* (2018.01); *F21Y 2115/10* (2016.08)

(58) Field of Classification Search
CPC ........... F21S 43/31; F21S 43/33; F21S 43/239
See application file for complete search history.

(56) References Cited

U.S. PATENT DOCUMENTS

| | | | | |
|---|---|---|---|---|
| 9,079,529 | B2 * | 7/2015 | Konishi | F21S 41/19 |
| 9,851,067 | B2 * | 12/2017 | Martinez | F21S 43/243 |

(Continued)

FOREIGN PATENT DOCUMENTS

| | | | |
|---|---|---|---|
| DE | 102006059980 A1 | 6/2008 | F21S 8/10 |
| DE | 102012221389 A1 | 5/2014 | F21S 8/10 |

(Continued)

OTHER PUBLICATIONS

European Search Report, Application No. 21183052.6, 9 pages, Nov. 16, 2021.

*Primary Examiner* — Tracie Y Green
*Assistant Examiner* — Michael Chiang
(74) *Attorney, Agent, or Firm* — Slayden Grubert Beard PLLC

(57) ABSTRACT

A light module for a lighting device of a vehicle is disclosed having at least one illuminant and a light-guiding body which is suitable and destined for guiding radiation emanating from the illuminant and coupled into the light-guiding body to a light exit surface of the light-guiding body, and having at least one rear wall apparatus which is arranged at least in certain areas in the beam path of ambient radiation incident from externally through the light exit surface of the light-guiding body into the light-guiding body. The rear wall apparatus has at least one first rear wall region and at least one second rear wall region, wherein the at least one first rear wall region and the at least one second rear wall region differ from one another in terms of reflection and/or absorption properties, for example with regard to the ambient radiation.

19 Claims, 10 Drawing Sheets

(51) Int. Cl.
*F21S 43/33* (2018.01)
*F21Y 115/10* (2016.01)

(56) References Cited

U.S. PATENT DOCUMENTS

| | | | | |
|---|---|---|---|---|
| 9,908,460 | B2 | 3/2018 | Zwick | |
| 2007/0195540 | A1* | 8/2007 | Misawa | G02B 6/0055 362/459 |
| 2008/0291685 | A1 | 11/2008 | Misawa et al. | 362/459 |
| 2016/0329020 | A1* | 11/2016 | Ma | F21V 7/04 |
| 2021/0062993 | A1* | 3/2021 | Buisson | F21S 43/249 |
| 2022/0011494 | A1* | 1/2022 | Mertens | F21S 43/50 |

FOREIGN PATENT DOCUMENTS

| | | | | |
|---|---|---|---|---|
| DE | 102014110225 | A1 | 1/2016 | F21V 8/00 |
| DE | 202017103875 | U1 | 10/2018 | F21S 43/00 |
| DE | 102018009248 | A1 | 5/2020 | F21S 43/242 |
| DE | 102020118661 | A1 | 3/2021 | F21S 43/236 |
| EP | 2889530 | A1 | 7/2015 | F21S 8/10 |
| JP | 2007123175 | A | 5/2007 | F21S 8/10 |

* cited by examiner

LIGHT MODULE FOR A LIGHTING DEVICE OF A VEHICLE AND METHOD FOR REDUCING A COLOR DESATURATION IN A LIGHT MODULE FOR A LIGHTING DEVICE OF A VEHICLE

CROSS-REFERENCE TO RELATED APPLICATIONS

This application claims priority to European Patent Application No. EP 211 830 52.6, filed on Jul. 1, 2021 with the European Patent Office. The contents of the aforesaid Patent Application are incorporated herein for all purposes.

TECHNICAL FIELD

The present invention relates to a light module for a lighting device of a vehicle having at least one illuminant and a light-guiding body which is suitable and destined for guiding radiation emanating from the illuminant and coupled into the light-guiding body to a light exit surface of the light-guiding body. The present invention further relates to a lighting device as well as a method for reducing a color desaturation in a light module, for example for a lighting device for example of a vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Lighting devices for vehicles have long been known from the prior art. Usually, a lighting device of a vehicle fulfills at least one light function.

Depending on the configuration of the lighting device (for instance as a headlight and/or as a signal lamp such as, for example, a brake lamp, a side marker lamp, turn signal lamp and/or as a rear lamp and/or as a daytime running lamp), the light function may be selected from a group of light functions which have an illumination function (for instance of a region of a roadway), a repeating flasher function for instance for indicating a turn, a brake light function for displaying braking activity, a side-marker light function such as, for instance, a back light function, in order to ensure the visibility of the vehicle by day and/or night, and the like as well as combinations thereof.

A light module for a motor vehicle having an extensive light body and an illuminant, the light beams of which may be coupled into the light body and which exit the light body outwards via a light exit surface, is known to the inventors. In this setup, a rear surface opposite the light exit surface may be covered with a reflective or diffusely backscattering cover which is formed by a frame-like component.

In some light modules, a color desaturation of white taillight elements may be observed by day behind transparent lenses. For example, a color desaturation may occur in the case of 3D LED back lights as in the case of taillight and turn indicator surfaces, for example.

As a solution to avoid a color desaturation, implementing monochromatic light functions with colored lenses is possible. However, this does result in the disadvantage that multi-colored dual functions cannot be implemented.

A change in the color and surface structure of the entire rear wall in order to remedy this disadvantage adversely entails a restriction in the homogeneity or light yield. Using a surface light guide without a rear wall leads, in turn, to the disadvantage of an intensity superimposition of elements located behind one another.

SUMMARY

A need exists to overcome the disadvantages known from the prior art and to provide a light module, a lighting device, and a method for reducing a color desaturation in a light module, for example for a lighting device of a vehicle.

The need is addressed by the subject-matter of the independent claims. Embodiments of the invention are described in the dependent claims, the following description, and the drawings.

DESCRIPTION

Figure 1A:
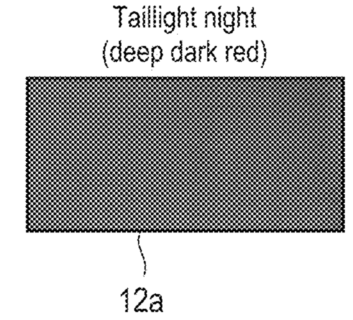
FIGS. 1 *a-d* show comparative representations of vehicle lamps operated at night and by day according to the prior art.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments and in a light module for a lighting device, for example of a vehicle, having at least one illuminant and a light-guiding body, the light-guiding body is suitable and destined for guiding radiation emanating from the illuminant and coupled into the light-guiding body to a light exit surface of the light-guiding body (for example in order to exit from the light-guiding body).

In some embodiments, the light module has at least one rear wall apparatus which is for example arranged at least in certain areas in the beam path of ambient radiation incident from externally through the light exit surface of the light-guiding body into the light-guiding body. The light exit surface is for example a substantially planar (side) surface of the light-guiding body.

In some embodiments, the rear wall apparatus (for example on the side facing the light body) has at least one first rear wall region and at least one second rear wall region, wherein the at least one first rear wall region and the at least one second rear wall region differ from one another in terms of reflection and/or absorption properties, for example with regard to the ambient radiation (or ambient radiation which is incident from externally through the light exit surface into the light-guiding body).

In other words, a rear wall apparatus is proposed, which has for example on its side facing the light-guiding body at least two rear wall regions which differ from one another in terms of their reflection and/or absorption properties, for example with regard to the ambient radiation incident into the light-guiding body and striking the rear wall apparatus.

The provision of various rear wall regions, which differ from one another in terms of their absorption and/or reflection behavior, for example with regard to the (ambient) rays, offers the benefit that good homogeneity, for example the large range of an angle of visibility of a rough light (white) rear wall region may therefore be combined, at the same time, with a colored or reflective rear wall region which offers a reduced color desaturation.

Advantageously, thanks to the, in each case, at least one first and second rear wall regions which differ in their reflection and/or absorption properties, the benefit of a rear wall region having high reflection and/or low absorption may be combined with the benefit of a rear wall region having low reflection and/or high absorption, which may provide a reduced color desaturation.

A decrease in the color desaturation of externally illuminated optical surfaces may be attained at the same time as fulfilling the desired light function in the best possible way by the at least one first and second rear wall region proposed according to some embodiments.

For example, the at least one first and/or the at least one second rear wall region is for example arranged in the beam path of ambient radiation incident from externally through the light exit side of the light-guiding body into the light-guiding body.

The at least one first rear wall region is for example designed and the absorption and/or reflection properties are for example selected in such a way that, for example, the absorption and/or (diffuse) scattering or reflection of the radiation striking the first rear wall region cause(s) the spectrum of the radiation emanating from the light exit surface to substantially correspond to the spectrum of the radiation emanating from the light exit surface, coupled in by the at least one illuminant into the light-guiding body, and/or to only slightly deviate from the latter. For example, the term “only slight deviation” may be understood to mean that (substantially) no difference may be visually perceived by a user of the light function or said difference is within a (for example predefined) tolerance range.

However, it is also conceivable that the at least one first rear wall region is adjusted to a light function to be fulfilled by the light module (for example, output of light of a predefined spectrum) in such a manner that it is suitable and destined for absorbing (and/or reflecting) radiation striking the at least first rear wall region wavelength-selectively as a function of the predefined spectrum or spectrum to be output.

For example, the first rear wall region may have a colored or reflective (surface) region. The color of the rear wall region may for example be adapted to the spectrum to be output by the light module and/or the light function to be fulfilled by the light module. The first rear wall region for example has the color of the radiation to be output by the light module.

The at least one second rear wall region is for example designed and the absorption and/or reflection properties are for example selected in such a way that (for example as good as possible) a homogeneity and/or (as large as possible) a light yield and/or (as high as possible) an intensity of the radiation emanating from the light exit surface is/are attained for example by reflection of the radiation striking the second rear wall region. For example, the at least one second rear wall region may have a light, for example white, and/or (comparatively) rough surface.

The term “a rough surface” is for example understood to be a non-reflective surface, by which radiation striking the surface is for example diffusely reflected.

The term “reflection properties” is for example to be understood to be a quantity which is characteristic of a reflection and/or backscattering of incident radiation, for example a reflectance. In particular, the term “reflection” not only includes directed (mirroring) reflection, but also diffuse reflection or radiation scattered on the surface (for example in an undirected manner or diffusely). The reflection properties may for example relate to at least one portion of the at least first or second rear wall region and, particularly for example, to the entire at least first or second rear wall region.

The term “absorption properties” is for example to be understood to be a quantity which is characteristic of an absorption of incident radiation, for example an absorptance. The absorption properties may for example relate to at least one portion of the at least first or second rear wall region and, particularly, for example, to the entire at least first or second rear wall region.

The absorption properties and/or reflection properties may relate to the light exit surface (and/or for example in relation to a notional plane formed through the light exit surface and/or a notional plane parallel to the light exit surface) and, as a result, ambient radiation incident from externally (and striking the respective at least first or second rear wall region).

(In other words), the absorption properties (and, analogously, the reflection properties) may for example be a quantity which is characteristic of an absorption (and, analogously, the reflection) of (ambient) radiation incident through the light exit surface from externally into the light-guiding body, which strikes the respective (at least first or second) rear wall region, through the respective (at least first or second) rear wall region.

For example, the at least first rear wall region (at least in certain areas and for example substantially over the entire rear wall region) may have an absorptance and/or reflectance which differ(s) from the absorptance and/or reflectance of the at least second rear wall region.

The at least first rear wall region may for example have at least in sections and for example over the respective entire region thereof a substantially homogeneous and/or identical reflectance and/or absorptance. The at least second rear wall region may for example have at least in sections and for example over the respective entire region thereof a substantially homogeneous and/or identical reflectance and/or absorptance.

The at least first rear wall region and the at least second rear wall region each for example (substantially) have, over the respective (surface) region thereof, a homogeneous configuration and/or construction and/or surface condition and/or (surface) structure and/or color.

The light body is for example an extensive light body. An extensive light body is for example understood to mean a light body, the (geometric) extent of which in two out of three spatial directions is clearly larger (for example by at least a factor 3, for example by at least a factor 4, or by at least a factor 5) than in the third spatial direction.

The light module is for example designed and/or the illuminant is arranged in relation to the light-guiding body in such a way that radiation emanating from the illuminant may be or is coupled in via a side surface (the light entry side) of the light-guiding body and the radiation coupled into the light-guiding body is guided to a light exit side of the light-guiding body and, for example, to the light exit surface (through the light-guiding body). The light exit side of the light-guiding body may for example have the light exit surface or, for example, the light exit side of the light-guiding body forms the light exit surface (configured as an emission surface).

The light module and, for example, the light-guiding body for example have a (for example optical) outcoupling apparatus, by means of which the radiation emanating from the illuminant, for example coupled in laterally at the light entry side (which is for example a side surface of the light-guiding body), for example (at least primary radiation), is coupled out of the light-guiding body via the light exit surface. The outcoupling apparatus may have a plurality of optical outcoupling elements for scattering and/or reflecting the light module emanating from the illuminant in the direction of the light exit surface. The plurality of optical outcoupling elements may have a profile which is sawtooth-like and/or sawtooth-shaped in cross-section. The outcoupling apparatus may be formed by a surface profile of the light-guiding body.

The light-guiding body is for example substantially cuboidal (wherein for example a surface structure and/or surface profiling present for forming an outcoupling apparatus is not taken into account here). The light exit surface and/or the light exit side is/are for example surrounded by side surfaces of the light body or is/are (immediately) adjacent to the side surfaces of the light-guiding body.

Viewed from the light exit surface in the direction of a rear side of the light-guiding body opposite the light exit surface and, for example, in the direction of a rear surface opposite the light exit surface, the rear wall apparatus is for example arranged behind the rear side and for example behind the rear surface.

The rear wall apparatus may cover the rear side (which is for example the side opposite the light exit side and/or the light exit surface of the light-guiding body) of the light-guiding body at least in certain areas and for example completely. The rear wall apparatus may extend (for example in a plane parallel to the extension plane of the rear side and/or of the light exit surface of the light-guiding body) over the extent of the light-guiding body (in a sectional plane through the light-guiding body along the light exit surface and/or the rear side or the rear surface of the light-guiding body).

For example, no further (optical) element is arranged between the rear wall apparatus and the light-guiding body. In particular, the rear wall apparatus is arranged opposite the light-guiding body in such a way that (ambient) radiation emanating for example from the rear side from the light-guiding body, for example in the direction of the rear wall apparatus, directly strikes the rear wall apparatus, for example without previously being scattered and/or reflected by a further optical element.

It is conceivable that the rear wall apparatus is adjacent to the light-guiding body at least in certain areas and is for example adjacent to the rear side (for example the rear surface) of the light-guiding body.

Both the at least first rear wall region and the at least second rear wall region are for example arranged on the same element of the rear wall apparatus. However, it is also conceivable that the rear wall apparatus has multiple elements, wherein it is conceivable that the at least one first rear wall region is arranged on the one element and the at least one second rear wall region is arranged on an element of the rear wall apparatus, which differs here from. The rear wall apparatus is for example designed as a one-piece element.

The light body may for example be configured as a light guide, for example as a surface light guide, and may for example have a transmittance (a translucency) in a range of approximately 85 percent to approximately 95 percent, for example in a range of approximately 90 to 95 percent. The transmittance may particularly be approximately 92 percent.

In some embodiments, a material of the at least first rear wall region differs from a material of the at least second rear wall region in absorption properties and/or reflection properties (for example at least in certain areas and, for example, over the entire at least first and/or second rear wall region). The material of the first rear wall region may for example have scattering properties which differ from the material of the at least second rear wall region. As a result, various regions of the rear wall region may be attained, which differ from one another in relation to their absorption and/or reflection behavior (and/or scattering behavior), due to the different choice of material and, as a result, affect the homogeneity and/or the light yield and/or the color desaturation and, for example, a reduction in the color desaturation of the light module in different ways.

The (at least partially) different material of the at least one first rear wall region in relation to the at least one second rear wall region for example contributes to the different reflection and/or absorption properties of the at least first rear wall region with respect to the at least second rear wall region and, for example, said properties are brought about (as well or exclusively) as a result.

In some embodiments, a surface condition of the at least first rear wall region differs from a surface condition of the at least second rear wall region (for example at least in certain areas and, for example, over the entire at least first and/or second rear wall region). As a result, a different effect of the rear wall regions in terms of a color desaturation during external illumination and/or homogeneity and/or intensity of the emitted radiation may also be attained.

The different surface condition (at least in certain areas) of the at least one first rear wall region in relation to the at least one second rear wall region may for example contribute to the different reflection and/or absorption properties of the at least first rear wall region with respect to the at least second rear wall region and, for example, said properties are brought about (as well or exclusively) as a result.

In some embodiments, the at least one first rear wall region differs at least in certain areas and for example over the entire first rear wall region from the at least one second rear wall region due to a surface geometry, wherein differing reflection and/or absorption properties (of the at least one first rear wall region from the at least one second rear wall region) are, as a result, for example brought about (as well and for example exclusively). As a result, a different effect of the rear wall regions in terms of a color desaturation during external illumination and/or homogeneity and/or intensity of the emitted radiation may also be attained.

For example, the at least one first rear wall region (and/or the at least one second rear wall region) may have a surface geometry which is a surface geometry deviating from a planar surface. For example, this first rear wall region may have at least one depression and/or at least one curved surface wall and/or at least one recess and/or at least one protrusion.

The surface geometry deviating from a planar surface is for example suitable and destined for receiving or absorbing radiation falling onto the surface geometry (for example radiation coming from the direction of the light-guiding body and for example (ambient) radiation irradiated through the light exit surface of the light-guiding body) and/or for reflecting it (due to the geometry) more frequently than once, for example more frequently than twice, for example more frequently than three times, for example more frequently than four times and, for example, more frequently than five times, and/or for reflecting it and/or scattering it from a surface wall before said radiation leaves the respective rear wall region.

The at least one second rear wall region may be designed to be (substantially) planar or is designed as a planar surface at least in sections and for example over the entire second rear wall region.

It is conceivable that the at least one first rear wall region is also designed to be (substantially) planar or is designed as a planar surface at least in sections and for example over the entire first rear wall region.

The at least one first rear wall region and the at least second rear wall region may for example be designed to be (substantially) planar or are designed as a planar surface at least in sections and for example over the entire first rear wall region. In this case, the at least first rear wall region and the at least second rear wall region differ due to the nature of their materials and/or due to their surface condition, so that different reflection and/or absorption properties are for example brought about as a result.

In some embodiments, the at least one first rear wall region has a surface geometry deviating from a planar surface and the at least one second rear wall region is designed to be planar or designed as a planar surface. The at least one first rear wall region (for example in this case) for example has an identical nature of the materials in relation to the at least one second rear wall region. It is also possible that (for example here) the surface apparatus having the at least first rear wall region and the at least second rear wall region is produced from the same workpiece and/or in a joint (single) method step.

First and/or second rear wall regions designed as planar surfaces may be arranged (substantially) parallel to the light exit surface of the light-guiding body and/or to the rear side or rear surface of the light-guiding body.

The at least one first and/or the at least one second (for example all) rear wall region(s) is/are for example aligned with regard to the light-guiding body and for example with regard to the light exit surface and/or the rear side or the rear surface, wherein a (substantial) optimization of an intended absorption and/or reflection of (ambient) radiation penetrating (for example at a predefined angle) through the light exit surface into the light-guiding body by the respective rear wall regions is for example brought about by the alignment.

The side of the rear wall apparatus facing the light-guiding body and/or the surface of the rear wall apparatus facing the light-guiding body, which for example has the at least one first and/or the at least one second rear wall region, for example extend(s) substantially along a main extension plane. The rear wall apparatus is for example aligned with respect to the light-guiding body in such a way that the main extension plane is arranged substantially parallel to the light exit surface and/or to the rear side and/or to the rear surface of the light-guiding body.

In some embodiments, a main extension direction of a portion of the first rear wall region (and for example, additionally, a main extension direction of a further portion of the first rear wall region which is different from the first-indicated portion and/or opposite the first-indicated portion as well) with the main extension plane of the side of the rear wall apparatus facing the light-guiding body and/or with a main extension direction of the second rear wall region and/or with a main extension direction of the light exit surface and/or the rear side of the light-guiding body encloses an angle which differs from zero and, for example, an angle in a range between 20° and 80°, for example between 30° and 70°, for example between 40° and 60°, for example between 40° and 50° and, for example, an angle of (substantially) 45°. This portion is for example a region (immediately) adjoining and/or adjacent to a second rear wall region.

This offers the benefit that radiation striking approximately perpendicular the main extension plane of the side of the rear wall apparatus facing the light-guiding body is not retroreflected, that is to say that it is not reflected in a direction perpendicular to the main extension plane. Therefore, it is achieved that ambient radiation incident approximately perpendicular to the main extension plane is not substantially coupled into the light-guiding body (again) and immediately guided (from there in the direction of the light exit surface) after only being reflected and/or scattered by the rear wall region once.

The two indicated portions of the first rear wall region are for example parallel to one another and/or have a surface profile parallel to one another. The first-indicated portion and, for example, the two indicated portions may extend into the rear wall apparatus (for example with regard to the main extension plane of the surface of the rear wall apparatus facing the light-guiding body).

In some embodiments, a main extension direction of the at least one first rear wall region runs obliquely to the main extension plane and configures for example an angle between 30° and 70°, for example between 40° and 60°, for example between 40° and 50° and, for example, of substantially 45° (between the main extension direction of the at least one first rear wall region and the main extension plane). Viewed in a direction along the main extension plane, a bottom region of the first rear wall region is for example arranged closer to the illuminant than an opening region of the first rear wall region, in which radiation enters the first rear wall region and which is for example arranged in the direction of incidence of radiation incident in the first rear wall region in front of the bottom region of the first rear wall region.

In other words, the direction of incidence of the primary radiation emitted by the illuminant configures an acute angle (for example an angle between 40° and 60°, for example between 40° and 50° and, for example, of substantially 45°) with a first sidewall portion (facing the illuminant) of the first rear wall region which, viewed in this direction of incidence, is arranged after a second side wall portion (facing away from the illuminant) of the first rear wall region.

This offers the benefit that secondary radiation generated by the primary radiation emitted by the illuminant and coupled into the light-guiding body, which secondary radiation strikes the first sidewall portion (facing the illuminant), is guided by this from the first rear wall region for example in the direction of the light-guiding body and for example in the direction of the light exit surface and is for example reflected and/or scattered. As a result, the light yield of the light module may be increased.

In some embodiments, the at least one first rear wall region delimits (for example at least in sections and for example completely) a cavity, for example for receiving ambient radiation incident from externally through the light exit surface of the light-guiding body into the light-guiding body. The cavity is for example a cavity which is open only on one side (for example the side facing the light-guiding body). In other words, the cavity for example simply has one opening, through which radiation may penetrate the cavity. The configuring and/or delimiting of a cavity offers the benefit that ambient radiation incident in the cavity is for example reflected and/or scattered several times by a cavity wall before the ambient radiation leaves the cavity.

However, it is also conceivable that the cavity is (for example only) delimited in a direction perpendicular to the main extension plane of the rear wall apparatus (for example of the side facing the light-guiding body) and/or in a direction perpendicular to the light exit surface of the light-guiding body. In particular, the cavity may be configured in an elongated and/or groove-like and/or groove-shaped and/or wave-shaped manner and open at at least one end (for example at both side ends) of the elongated and/or groove-like and/or groove-shaped and/or wave-shaped structure. The term "elongated" is for example to be understood to mean that the cavity follows a path, the length of which is many times (for example two times, for example four times, for example 10 times, or for example 20 times) larger than a (for example each) extent of the cavity in a direction perpendicular hereto.

The cavity (and for example a central axis of the cavity) may for example extend in a (main extension) direction, which encloses, with the main extension plane of the side facing the light body and/or surface of the rear wall apparatus, an angle which differs from zero and, for example, an angle in a range between 20° and 80°, or between 30° and 70°, for example between 40° and 60°, or for example between 40° and 50° and, for example, an angle of (substantially) 45°. Side walls of the cavity for example extend (substantially) parallel to the central axis and/or to the main extension direction of the cavity.

An angle of 45° is particularly beneficial, since radiation incident perpendicular to the main extension plane of the (side of the) rear wall apparatus (facing the light body) is scattered and/or reflected by a side wall (formed by the first rear wall region) of the cavity parallel to the main extension apparatus and is (subsequently) scattered and/or reflected by a further side wall of the cavity further away in the direction of the main extension plane and/or the light body into the interior of the cavity.

In some embodiments, the at least one first rear wall region has a light trap and/or configures a light trap. The cavity is for example configured as a light trap. The light trap may have a feed portion which guides the radiation to be received and/or absorbed by the light trap into the cavity. The inner surface of the cavity is for example configured in an absorbent and/or scattering manner. The surface of the feed portion is for example reflective, but may also be configured in an absorbent and/or scattering manner.

The term "light trap" is for example understood to be a radiation receiving region which is for example suitable and destined for receiving radiation without directed backscattering (from the radiation receiving region). A light trap is for example to be understood to be a substantially backscatter-free radiation receiving region for attenuating and/or absorbing unwanted (ambient) radiation and/or a radiation receiving region which is configured and destined for reflecting and/or scattering radiation entering the radiation receiving region prior to the exit thereof from the radiation receiving region at least three times, for example at least five times and, for example, at least eight times.

In some embodiments, the at least second rear wall region has an absorbent coating at least in certain areas (and for example over the entire rear wall region). This offers the benefit that (for example unwanted) ambient radiation striking the at least second rear wall region is absorbed by the absorbent coating (at least partially and for example in accordance with an absorptance of the absorbent coating).

The absorbent coating for example has nanoparticles and/or microparticles which are suitable and destined for absorbing (unwanted) radiation (which is for example visible to humans). For example, the absorbent coating may have carbon nanotubes (also CNT) in order to absorb radiation.

In some embodiments, the at least second rear wall region has nanomaterials, for example having an aligned structure, in order to absorb incident ambient radiation.

In some embodiments, the rear wall apparatus has a plurality of, for example similar and for example identical, first rear wall regions and/or a plurality of, for example similar and for example identical, second rear wall regions. The provision of a plurality of first rear wall regions and/or a plurality of second rear wall regions offers the benefit that more homogeneous emission is feasible.

Each first rear wall region is for example configured from the plurality of first rear wall regions according to an embodiment described (for example above) in the context of the at least one first rear wall region. Each first rear wall region is for example configured from the plurality of first rear wall regions in accordance with the same embodiment described (for example above) in the context of the at least one first rear wall region.

By providing a plurality of first rear wall regions and/or a plurality of second rear wall regions, the (existing) rear wall may for example be structured to minimize color desaturation.

Furthermore, the proposed light module is a scalable approach which may be scaled in relation to an area size of the rear wall. In addition, the proposed light module combines suitability for high-volume production with low production costs.

Each second rear wall region is for example configured from the plurality of second rear wall regions according to an embodiment described (for example above) in the context of the at least one second rear wall region. Each second rear wall region is for example configured from the plurality of second rear wall regions in accordance with the same embodiment described (for example above) in the context of the at least one second rear wall region.

The plurality of, and for example all of the, first rear wall regions and/or the plurality of second rear wall regions, for example all of them, has/have the same extent and/or the same area in relation to the main extension plane and/or a cross-sectional plane.

In some embodiments, the plurality of, for example similar, first rear wall regions and/or the plurality of, for example similar, second rear wall regions is/are arranged periodically. This offers the benefit of a regular light emission through the light module.

A plurality of first rear wall regions and a plurality of second rear wall regions are for example arranged in alternating sequence. As a result, homogeneous light emission through the light module is beneficially brought about. In each case, a first rear wall region is for example exclusively (immediately) adjacent to and/or surrounded by second rear wall regions. In addition, it is also possible that a second rear wall region is in each case (immediately) exclusively adjacent to and/or surrounded by first rear wall regions.

In some embodiments, the plurality of, for example similar, first rear wall regions and/or the plurality of, for example similar, second rear wall regions is/are arranged in a strip-like and/or grid-like and/or grating-like and/or checkered manner. It is also conceivable that a plurality of first rear wall regions is (in each case) arranged line by line (or along a diagonal) and/or a plurality of second rear wall regions is (in each case) arranged line by line (or along a diagonal).

The at least one first rear wall region and for example the plurality of, for example similar and/or identical, first rear wall regions and/or the at least one second rear wall region and for example the plurality of, for example similar and/or identical, second rear wall regions is/are for example arranged in the form of a (for example regular) pattern and/or a (geometric) shape. The regions having different absorption and/or reflection are beneficially embodied as a pattern or geometric shape in order to achieve an attractive design appearance or a design appearance supporting better perceptibility of the contours and/or light function.

The at least one first rear wall region and for example the plurality of, for example similar and/or identical, first rear wall regions and/or the at least one second rear wall region and for example the plurality of, for example similar and/or identical, second rear wall regions for example configure(s) a (for example geometric) structure of the rear wall apparatus, for example having a predefined structure size. The structure size may for example be predefined and provided by a geometric extent of the first rear wall region and/or the second rear wall region (and in accordance with an arrangement by a whole-number multiple of these respective geometric extents). The structure size may for example be influenced by selecting the size of a first and/or second rear wall region and/or by arranging identical or similar (first or second) rear wall regions next to one another.

The side (facing the light-guiding body) and/or surface of the rear wall apparatus is/are for example formed (at least in certain areas and for example substantially in its entirety) from (exclusively) at least one first rear wall region and/or at least one second rear wall region and for example from a plurality of first rear wall regions and/or a plurality of second rear wall regions.

A region formed by the at least one first rear wall region (and for example by the plurality of first rear wall regions) and/or by the at least one second rear wall region (and for example by the plurality of second rear wall regions) for example covers (at least in certain areas and for example substantially completely) a region which is arranged in a beam path and, for example, through a plurality of (for example possible) beam paths of ambient radiation (which penetrates the light-guiding body from externally through the light exit surface and is deflected for example from the light-guiding body in the direction of the rear wall apparatus).

A (for example each) first rear wall region for example absorbs a higher (for example relative, that is to say for example in relation to a respective cross-sectional area of the rear wall apparatus parallel to the main extension plane) proportion of (predefined) ambient radiation striking the corresponding rear wall region than a (for example each) second rear wall region arranged (at the same position and having the same area). A (for example each) second rear wall region could for example be provided by a rough light and, for example, white rear wall region, while for example a (for example each) first rear wall region may be provided by a colored or reflective region and/or a region having a light trap.

A ratio of the cross-sectional areas of the total number of (the) first rear wall regions (described in more detail for example in the preceding paragraph) with respect to the cross-sectional areas of the total number of second rear wall regions (described in more detail for example in the preceding paragraph) for example lies in a range between 1:20 and 20:1, for example in a range between 1:10 and 10:1, for example in a range between 1:5 and 5:1, for example in a range between 1:3 and 3:1, for example in a range between 1:2 and 2:1 and, for example, in a range between 0.8 and 1.2, for example (substantially) around 1. In particular, the respective cross-sectional surface relates to a section through a respective rear wall region along a plane parallel to the main extension plane of the side of the rear wall apparatus facing the light body and/or to a section through a respective rear wall region along a plane parallel to the light exit side and/or the rear side of the light body. By selecting the cross-sectional area ratio, a respective compromise between reduced color desaturation and the large range of an angle of visibility or good homogeneity and/or light yield may for example be adjusted.

A ratio of the cross-sectional areas of the total number of these first rear wall regions with respect to the cross-sectional areas of the total number of these second rear wall regions for example lies in a range between 1:20 and 1, for example in a range between 1:10 and 1, for example in a range between 1:5 and 1, for example in a range between 1:4 and 1, for example in a range between 1:3 and 1, for example in a range between 1:2 and 1 and particularly in a range between 1:5 and 1. Therefore, in such a configuration, the emphasis is for example placed on the light yield and/or good homogeneity/large range of the angles of visibility, for example of a rough, light (for example white) rear wall region.

A ratio of the cross-sectional areas of the total number of these first rear wall regions with respect to the cross-sectional areas of the total number of these second rear wall regions for example lies in a range between 1 and 20:1, for example in a range between 1 and 10:1, for example in a range between 1 and 5:1, for example in a range between 1 and 4:1, for example in a range between 3 and 3:1, for example in a range between 2 and 2:1 and for example in a range between 1 and 1:5. Therefore, in such a configuration, the emphasis is for example placed on reducing the color desaturation.

The light module for example has a rear wall apparatus which is for example micro structured by a plurality of first and/or second rear wall regions, wherein the first rear wall regions (for example in each case) for example have and/or configure a light trap and/or a cavity.

The light module (for example in the case of a micro structured rear wall apparatus and/or in the embodiment, in which the first rear wall regions (for example in each case) have and/or configure and/or delimit a light trap and/or a cavity), has more than 10, for example more than 50, for example more than 100, for example more than 500 and, for example, more than 1000 first and/or second rear wall regions.

A (geometric) extent in at least one direction (and for example in each case in two directions perpendicular to one another) along a cross-sectional plane (which is parallel to the main extension plane of the side facing the light body or surface of the rear wall apparatus and/or parallel to a plane of the light exit side and/or the rear side of the light body) of a (for example each) first rear wall region, which particularly for example has and/or configures and/or delimits a light trap and/or a cavity, and/or (for example each) second rear wall region, is for example in a range between 50 μm and 1 cm, for example in a range between 75 μm and 5 mm, for example in a range between 100 μm and 3 mm, for example in a range between 100 μm and 1 mm and, for example, in a range between 200 μm and 500 μm.

The light module (for example in an embodiment, in which the first rear wall regions each differ from the second rear wall regions, for example exclusively, due to the nature of their materials and/or surface condition and for example, as a result, different absorption and/or reflection properties between the first and second rear wall regions are brought about), for example has at least 1, for example at least 2, for example at least 3, for example at least 5 and/or at most 10, for example at most 5, for example at most 4, for example at most 3, for example at most 2 and, for example, precisely one first and/or second rear wall region(s).

In an embodiment of the light module, in which the first rear wall regions each differ from the second rear wall regions, for example exclusively, due to the nature of their materials and/or surface condition and for example, as a result, different absorption and/or reflection properties between the first second rear wall regions are brought about, a (geometric) extent in at least one direction (and for example in each case in two directions perpendicular to one another) along a cross-sectional plane (which is parallel to the main extension plane of the side facing the light body or surface of the rear wall apparatus and/or parallel to a plane of the light exit side and/or the rear side of the light body) of a (for example each) first rear wall region and/or (for example each) second rear wall region, is for example in a range between 1 mm and 30 cm, for example in a range between 5 mm and 20 cm, for example in a range between 1 cm and 10 cm and, particularly in a range between 3 cm and 8 cm.

It is also conceivable that a first and/or second rear wall region extends substantially over the complete rear wall apparatus (on the side facing the light body) and encloses at least one and for example a plurality of the respective other (that is to say, second or first) rear wall regions and surrounds these.

It is also conceivable that a first (or alternatively a second) rear wall region extends along an outer circumference of the light module and/or the rear wall region and/or substantially follows a circumferential line of the light module, at least in sections. A second (or in accordance with the above alternative, a first) rear wall region is for example exclusively arranged (for example in the case of this embodiment) in a central and/or inner region of the light module and/or the rear wall apparatus (in relation to the cross-sectional plane parallel to the main extension apparatus of the rear wall apparatus).

It is possible that precisely one first rear wall region and precisely one second rear wall region are provided.

In some embodiments, the rear wall apparatus is an injection-molded part. The rear wall apparatus is for example in one piece and/or integral. The rear wall apparatus for example has polycarbonate and the rear wall apparatus particularly consists of polycarbonate.

The first rear wall regions and the second rear wall regions (in an embodiment of the light module, in which the first rear wall regions each differ from the second rear wall regions, for example exclusively, due to the nature of their materials and/or surface condition and, for example, different absorption and/or reflection properties are brought about, as a result, between the first second rear wall regions), are for example produced in at least one differing (for example injection-molding) production step (for instance, following one another in time and/or using a different pressure) and/or are produced from a material which differs in at least one component. Thus, the first rear wall regions could, for example, be (for example black) colored plastics or be produced from such, while the second rear wall regions may consist of or be produced from plastics colored with a light color and for example white plastics.

At least one first (or alternatively second) and for example all of the first (or alternatively second) rear wall regions are to for example be molded or produced initially in a first injection-molding method step, and at least one second (or one first, according to the above alternative) and all of the second (or alternatively first) rear wall regions are to be for example be molded or produced in a (for example subsequent) second injection molding method step (with a further material different from that in the first injection-molding method step).

At least one converging optical unit (or collimation optical unit) is for example arranged between the at least one illuminant and the side wall of the light-guiding body (into which the radiation of the illuminant is coupled or is to be coupled and/or may be coupled). The converging optical unit (or collimation optical unit) is for example suitable and destined for collecting or "capturing" light from an opening angle of a light emission of the light source of up to 180° and for example for coupling it into the light-guiding body.

The illuminant is for example a light source which may be operated electrically and which is for example mounted on at least one light entry side of the light body. The illuminant is for example configured as an illuminant which emits monochrome light, for example as a LED (LED=light-emitting diode), or as a (for example RGB) LED for emitting for example multicolored and/or white light and/or light of any color. The light module may have at least one and for example a plurality of illuminants configured as light-emitting diodes. The light module may have a board and/or a printed circuit board (PCB), on which the illuminant and for example the light-guiding body and/or the rear wall apparatus is/are arranged. In the present context, a light module may also be referred to as a lighting device, lighting assembly, or light source assembly.

A light-guiding body is for example understood to be a body which is suitable and destined for guiding (primary) radiation coupled into the light-guiding body, which propagates in a first region of the light-guiding body along a beam path extending in a first direction in such a way that the coupled-in (primary) radiation propagates in a second region (which is for example different from the first region) of the light-guiding body along a beam path extending in a second direction. In particular, the first direction differs from the second direction (and for example enclose an angle which differs from zero and/or are out of square with one another).

The first region may be a region of the light-guiding body, by which the radiation is coupled in, and/or the second region may be a region of the light-guiding body, by which the radiation is coupled out of the light-guiding body (that is to say, for example a region which comprises the light exit side at least in certain areas). The guiding of the radiation may be implemented, for example, via the outcoupling apparatus (outcoupling optical unit).

Some embodiments are directed to an (alternative) embodiment of a light module, for example for a lighting device for example of a vehicle, in which (at least and for example precisely) one OLED (OLED=organic light-emitting diode) serves as an illuminant. In particular, in the case of an OLED, the generated radiation within an OLED construction runs in a straight line or orthogonally to the layer construction, in which the radiation is emitted. The emitted radiation (for example generated in a stack of organic layers) then passes through a glass substrate or a polymer layer.

In this case, the light-guiding body is for example a body (for example designed as a glass substrate and/or as a polymer layer), in which a beam path of a (or of the) radiation generated (for example by the OLED) running in the light-guiding body, for example within the entire light-guiding body and/or from the entry region thereof into the light-guiding body up to the exit region thereof from the light-guiding body substantially runs in a straight line.

In particular, in this case, the light-guiding body is for example a body in which the radiation coupled into the light-guiding body (substantially) propagates along a direction of propagation extending in a straight line or a beam path (substantially) extending in a straight line up to the outcoupling thereof from the light-guiding body (and/or up to the light exit side).

This embodiment of a light module may have the at least one (and for example precisely one) illuminant designed as an OLED and the light-guiding body which is suitable and destined for guiding or transmitting radiation emanating from the illuminant and coupled into the light-guiding body to a light exit surface of the light-guiding body.

A light entry side of the light-guiding body, into which radiation emanating from the illuminant is coupled into the light-guiding body, is for example arranged on a side of the light-guiding body opposite the light exit surface.

The light-guiding body (in this embodiment) is for example a (clearly) transparent (external) lens.

This embodiment of a light module may have at least one rear wall apparatus which is arranged, at least in certain areas, in the beam path of ambient radiation incident from externally through the light exit side of the light-guiding body into the light-guiding body.

In the present embodiment, the rear wall apparatus has at least one first rear wall region and at least one second rear wall region, wherein the at least one first rear wall region and the at least one second rear wall region differ from one another in terms of reflection and/or absorption properties, for example with regard to the ambient radiation. The rear wall apparatus may have all of the features described above in the context of the light module, individually or in combination with one another.

This proposed (alternative) embodiment offers the benefit that, for example, multicolored OLEDs (for instance red/yellow) behind a clearly transparent exterior lens (for example during external (day) light exposure may also suffer from the color desaturation (described above). The utilization proposed above of a rear wall is (for example in an analogous manner) also conceivable in the case of (for example, transparent) OLEDs.

The OLED is for example a multicolored OLED (which, for example, emits light of red and/or yellow color).

The OLED is for example a transparent OLED. Here, the rear wall apparatus is particularly a structured rear wall (apparatus) and/or a rear wall apparatus, in which the at least one first rear wall region differs at least in certain areas and for example over the entire first rear wall region from the at least one second rear wall region due to a surface geometry and, as a result, differing reflection and/or absorption properties are brought about.

It is also conceivable that the (for example one non-transparent) OLED (itself) has one, for example its own, rear wall (generated for example in the context of the manufacturing process of the OLEDs) with the at least first rear wall region and the at least second rear wall region. In this case, the OLED configures the rear wall apparatus for example itself and/or is firmly bonded to the rear wall apparatus. For example, a structured rear wall apparatus could be effected in the context of the manufacturing process of the OLEDs by masking and/or evaporating (different) subregions.

Some embodiments are directed to a lighting device, for example a lamp, for example a rear lamp and/or turn indicator (or turn signal), and/or a lighting device for exterior and/or interior lighting, for a vehicle for example for fulfilling at least one of the light functions (described above) of the vehicle.

In some embodiments, the lighting device comprises at least one light module and for example a plurality of light modules according to at least one of the embodiments described above. The plurality of light modules is for example provided as a light unit, in which the plurality of light modules are integrally connected to one another. Furthermore, the light modules may be arranged and/or fastened on a joint board which also carries the illuminants assigned to the light bodies.

The lighting device is for example a vehicle lamp, for example a rear lamp (for example a taillight) or a turn indicator (for example a turn signal). The lighting device is for example a lighting device for exterior and/or interior lighting.

Some embodiments are directed to a vehicle, for example a motor vehicle, having at least one lighting device according to an embodiment described above and for example having at least two lighting devices according to the embodiment described above. In particular, the vehicle may be a (motorized) road vehicle.

Some embodiments are directed to a method for reducing, for example for suppressing, a color desaturation in a light module, for example for a lighting device for example of a vehicle, which occurs under the influence of ambient radiation, for example during (external) illumination of the light module with ambient radiation, in the case of (for example during) the fulfilment of a light function by means of the light module.

In this case, in order to fulfil the light function, the light module has at least one illuminant and for example a light-guiding body which is suitable and destined for guiding radiation emanating from the illuminant and coupled into the light-guiding body to a light exit surface of the light-guiding body, for example for exiting from the light-guiding body.

The at least one illuminant for example emits radiation which is for example coupled into the light-guiding body (for example by means of an incoupling optical unit) and is for example guided via an outcoupling apparatus (for example an outcoupling optical unit) and/or a light-guiding apparatus to the light exit surface of the light-guiding body, wherein the radiation exits for example at the light exit surface from the light-guiding body.

The light module furthermore has at least one rear wall apparatus which is arranged at least in certain areas in the beam path of ambient radiation incident from externally, for example through the light exit surface of the light-guiding body, into the light-guiding body and/or into the light module.

In some embodiments, the rear wall apparatus has at least one first rear wall region and at least one second rear wall region. In this case, the ambient radiation is absorbed and/or reflected to varying degrees by the at least one first rear wall region and the at least one second rear wall region.

The term "different degrees of absorption and/or reflection" is for example understood to mean that a different proportion of the irradiated (ambient) radiation is absorbed and/or reflected, and/or is backscattered and/or reflected back in the direction of the light-guiding body by the at least one first rear wall region compared to the at least one second rear wall region (for example with similar irradiation of (ambient) radiation and for example substantially over the entire rear wall region in each case).

The differing degrees of absorption and/or reflection are for example brought about by different absorption and/or reflection properties of the at least one first rear wall region with respect to the at least one second rear wall region.

That is to say, it is also proposed in the context of the method that the (existing) rear wall is structured in order to minimize the color desaturation. For example, due to different coloring or surface condition, (first and/or second) (rear wall) regions having different absorption and/or reflection are created. Beneficially, these regions are embodied as a pattern or geometric shape in order to achieve an attractive design appearance. The good homogeneity of a large region of the angles of visibility of a rough light (for example white) rear wall is beneficially combined with the reduced color desaturation of a colored or reflective region.

More beneficially, the pattern, the shape, the color and/or the reflectance and/or the structure size may be varied for various embodiments.

Some embodiments are directed to a method for operating a lighting device according to one of the embodiments described above, for example a headlight or lamp, for example for a vehicle, in order to fulfil a light function of the vehicle.

The light module described above is for example adapted, suitable and/or destined for carrying out the method for reducing a color desaturation as well as all the method steps already described above in connection with the method, individually or in combination with one another. Conversely, the method may be equipped with all of the features described in the context of the light module, individually or in combination with one another.

The vehicle (described above) may be a motor vehicle which is, for example, a motor vehicle controlled by the driver himself ("driver only"), a semi-autonomous, autonomous (for example, of autonomy level 3 or 4 or 5 (of standard SAE J3016)) or a self-driving motor vehicle. Level 5 level of autonomy describes fully automatic vehicles. Equally, the vehicle may be a driverless transport system. The vehicle can, in this case, be controlled by a driver or drive autonomously.

Moreover, in addition to a road vehicle, the vehicle may also be an air taxi, an airplane and another means of transportation or another type of vehicle, for example an aircraft, water craft (e.g., ship) or rail vehicle.

The light module and the lighting device has been described in connection with a vehicle. However, the present teachings are also transferable to other light modules or lighting apparatuses or lighting systems such as, for example, in the field of general transportation (aircraft construction, rail vehicles, shipbuilding), in the field of general lighting, in the field of advertising lighting or in the field of consumer electronics, and/or to light functions to be fulfilled (for example, lighting and/or illumination) from these fields. The applicant reserves the right to likewise claim a light module for a lighting device from one of the indicated areas and/or the use of the described light module or a lighting device or the operation of a light module or a lighting device for this purpose.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS.

FIGS. 1*a* and *b* show comparative representations of a taillight operated at night according to the prior art 12*a* (FIG. 1*a*) as well as the taillight 12*a* (FIG. 1*b*) operated by day under the influence of ambient radiation (in each case in a top view of the light exit surface or the lamp face or of a lens of the vehicle lamp). As a further example, FIG. 1*c* shows a turn indicator operated at night according to the prior art 14 and, as a comparison hereto, the turn indicator 14 operated by day (under the influence of ambient radiation) (in each case in a top view of the light exit surface or the lamp face or of a lens of the vehicle lamp).

Figure 1B:
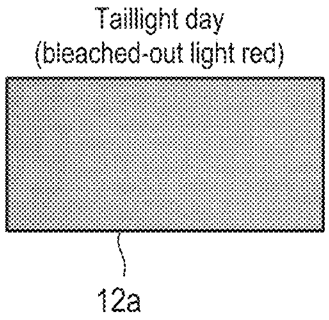
Figure 1C:
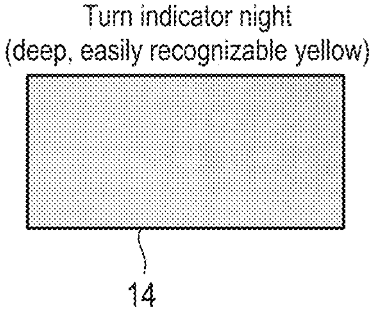
Figure 1D:
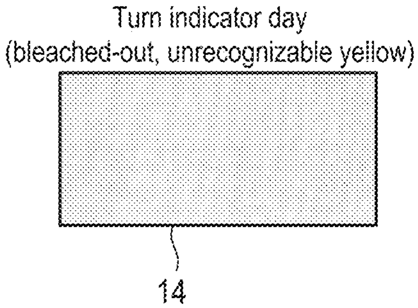

It is obvious from the respective comparisons of the corresponding representations of FIG. 1*a* and FIG. 1*b* as well as the representations of FIGS. 1*c* and 1*d* that the vehicle lamps 12*a* and 14 each have a deeper hue at night (and therefore without the influence of ambient radiation or without external illumination of the vehicle lamp with ambient radiation) or output light with a deeper hue than by day (under the influence of ambient radiation or with external illumination of the vehicle lamp with ambient radiation).

FIGS. 1*a*-1*d* illustrate the (unwanted) color desaturation which occurs with, for example, white taillight elements according to the prior art by day behind transparent lenses and, for example, with 3D LED back lights.

FIGS. 16-19 show representations to illustrate the theory regarding color desaturation at dusk or by day.

Figure 16:
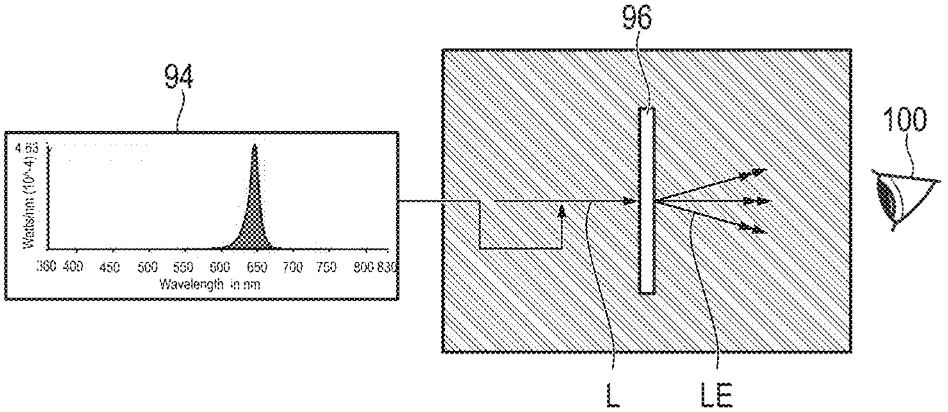
FIGS. 16-19 show a representation to illustrate the theory regarding color desaturation at dusk or by day.

To this end, FIG. 16 shows a transmission at night. The LED spectrum 94 is generated, the radiation L is coupled into a white, diffuse lens 96 and exits as light emission LE on the side of the lens 96 facing the external surroundings. This emitted radiation may be perceived by an observer 100.

Figure 18:
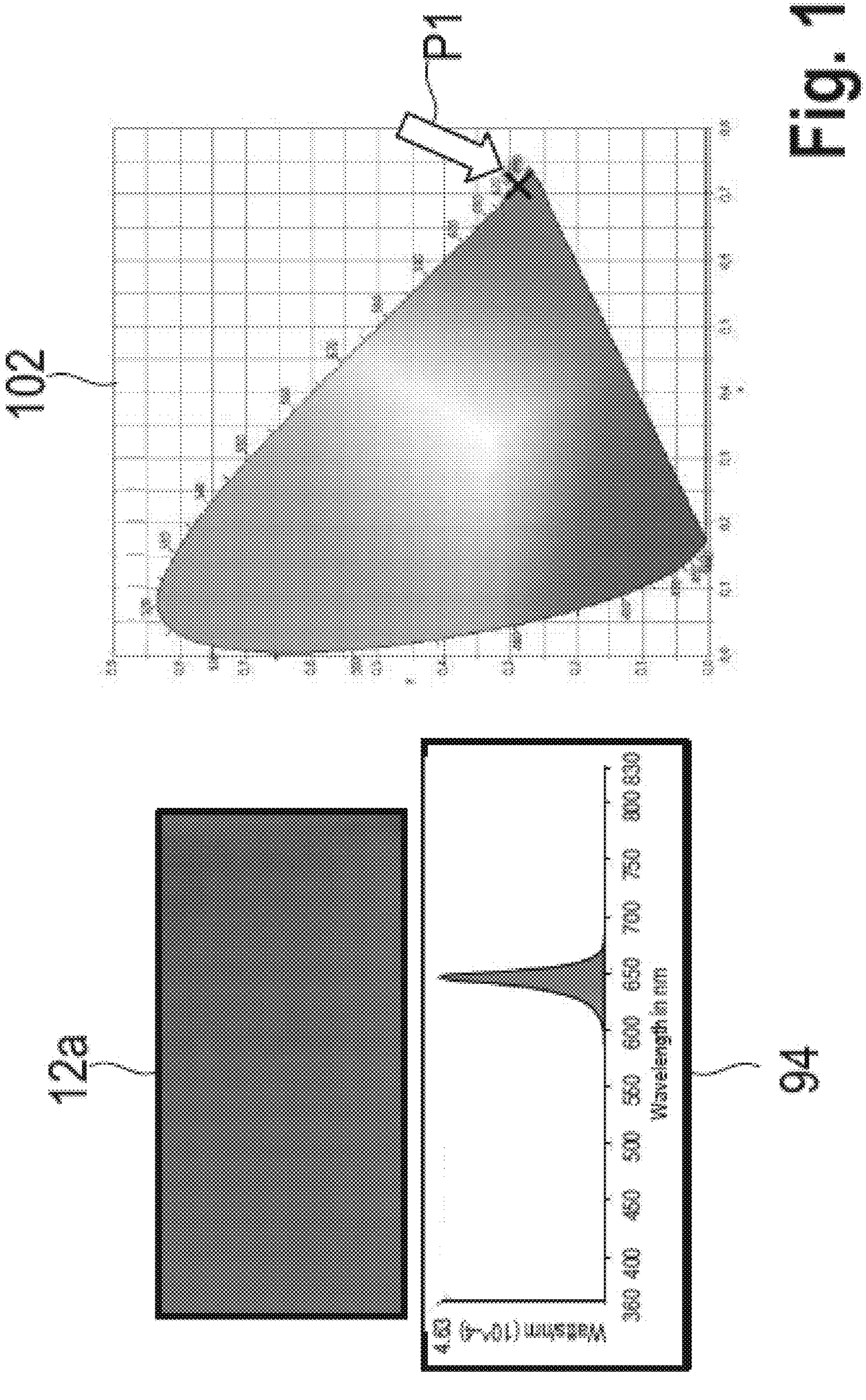
Figure 19:
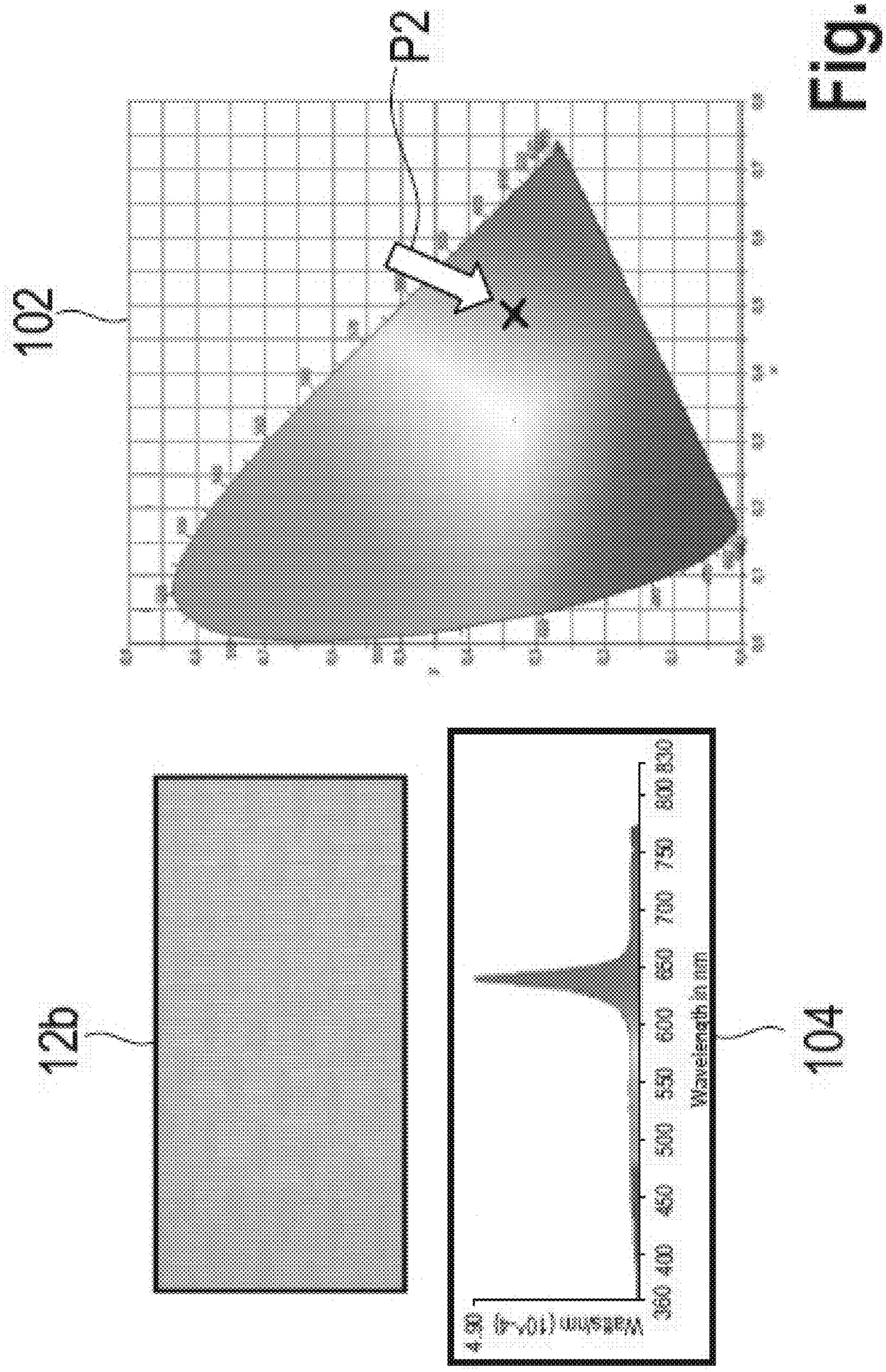

On looking at the side of the lens 96 facing the outer surroundings, the observer substantially perceives the LED spectrum 94 shown in FIG. 18, the perceived color of which (such as, for instance, in the photograph of a taillight 12*a* at night) is depicted with the cross identified by the arrow P1 in the color space 102 of FIG. 18.

Figure 17:
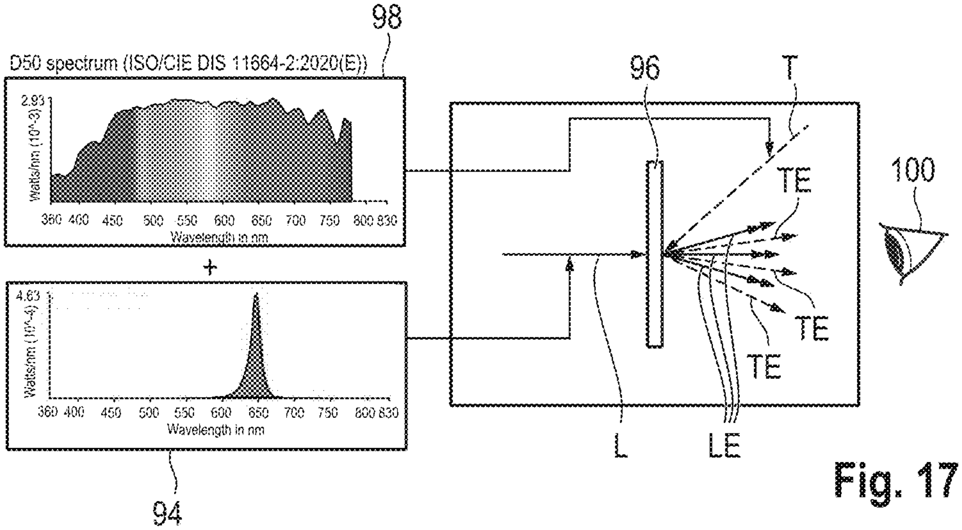

FIG. 17 depicts a corresponding situation by day or at dusk. By day or at dusk, the observer 100 perceives a superposition of the light LE transmitted through the white diffuse lens, which has the LED spectrum 94, as well as ambient radiation TE, which is produced following reflection of ambient radiation T irradiated on the white, diffuse lens 96 according to the daylight spectrum 98. The perceived spectrum corresponds to a superposition of the LED spectrum 94 and of the daylight spectrum 98 and produces the spectrum 104 depicted in FIG. 19. The superimposition of the LED spectrum and of the daylight spectrum results in another color being perceived, which is desaturated compared to the sole LED spectrum (cf. representation 12*b*). This desaturation is illustrated by the color value marked with arrow P2 in the color space 102, which is obtained by transmission of the LED radiation and reflection of daylight radiation.

Figure 3:
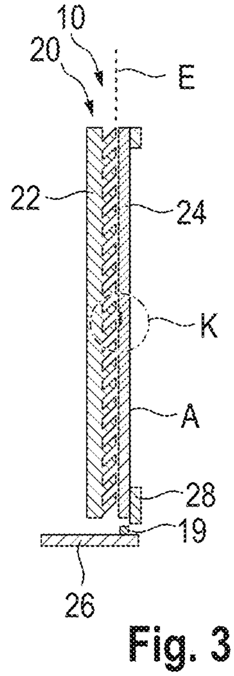
FIG. 3 shows a schematic cross-sectional representation of a light module according to an embodiment.

FIG. 3 shows a schematic cross-sectional representation of a light module 10 according to an embodiment, here a surface light guide having a beam trap. The reference numeral 24 identifies a light-guiding body which is a surface light guide, having an outcoupling optical unit (or an outcoupling apparatus). An LED 19 or multiple LEDs arranged on a printed circuit board 26 (PCB) emit(s) radiation, it is coupled (for example via an incoupling optical unit) into the light-guiding body 24 and guided via the outcoupling optical unit to the light exit surface A of the light-guiding body 24, via which the (primary) radiation exits from the light-guiding body.

The embodiment shown in FIG. 3 additionally has a rear wall apparatus 20 configured as a rear wall (here configured in one piece). The reference numeral 28 identifies a diaphragm or a frame which is arranged here on the light exit side of the light-guiding body (which has the light exit surface A), in an outer edge region of the light-guiding body.

The reference numeral E identifies the course of a main extension plane running perpendicular to the plane of the figure (for example by the dashed line identified with E) of the side of the rear wall apparatus 20 or the rear wall 22 facing the light-guiding body 24. This for example runs (as depicted here) parallel to the light exit surface A and/or parallel to the rear side of the light-guiding body 24 opposite the light exit surface A.

Figure 4:
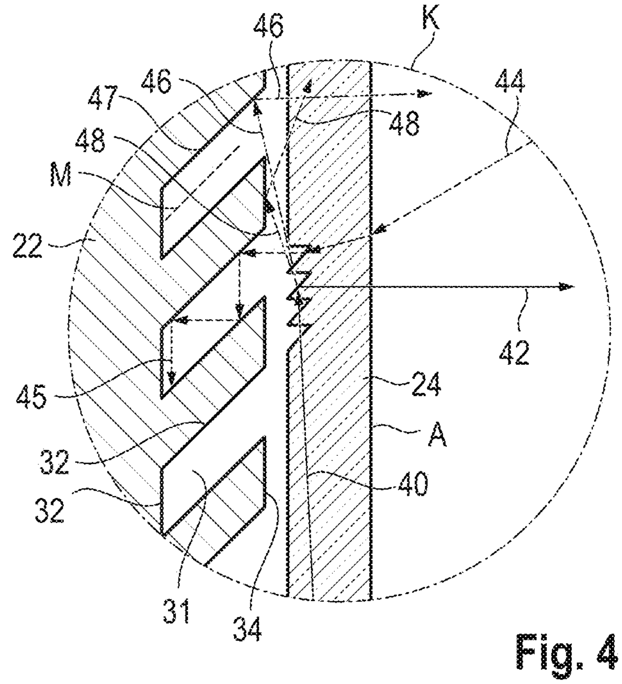
FIG. 4 shows a detailed representation of a cutout from the light module depicted in FIG. 3.

FIG. 4 shows a detailed representation of a cutout from the light module depicted in FIG. 3. In this case, the same reference numerals identify elements that are the same, have the same effect or are functionally the same.

From this detailed representation, the (optical) outcoupling apparatus (which here has a sawtooth-shaped cross-section) is formed here by the light-guiding body 24 (by a surface structure). This outcoupling device is suitable and destined for deflecting (primary) radiation 40 originating from the illuminant (here an LED) in the direction of the light exit surface A, so that the primary radiation 42 deflected or scattered in the direction of the light exit surface A may exit from the light-guiding body 24 (and from the light module) via the light exit surface A.

The reference numeral 22 identifies the rear wall (which here forms the rear wall apparatus 20) designed in one piece and integrally (and produced from a material, for example in exclusively joint method steps or produced in a single injection-molding step). This has a second rear wall region 34 on its side facing the light-guiding body. In the detailed representation, four second rear wall regions 34 (depicted at least partially) are obvious. These second rear wall regions 34 are in each case a reflection surface (of the rear wall). The reference numeral 32 identifies a first rear wall region which here delimits a beam trap 31. In the detailed representation of FIG. 4, three first rear wall regions 32 may be seen. All of the first and second rear wall regions are embodied identically here and arranged periodically.

The first rear wall regions extend away from the main extension level E (see FIG. 3) into the interior of the rear wall. In this case, a main extension direction of the first rear wall region 32 and/or of at least one portion of the first rear wall region (which for example runs along a central axis M of the first rear wall region 32), along which the first rear wall region extends into the interior of the light-guiding body, for example encloses an acute angle, and, particularly, an angle of 45°, with the main extension plane E.

The light trap and/or the first rear wall region is/are for example inclined with respect to the main extension plane E of the rear wall apparatus 20 in such a way that a bottom region of the first rear wall region 32 is arranged in (exclusively) one direction running along the main extension plane E closer to the illuminant (here the light-emitting diode 19) than an opening region and/or an edge region of the light trap or of the first rear wall region 32 (which is adjacent to a second rear wall region 34).

As is obvious from the beam path illustrated in FIG. 4 of ambient radiation 44 incident from externally through the light exit surface A into the light-guiding body 24, this is received and absorbed in the light trap 31 formed and/or delimited by the first rear wall region 32 (illustrated by beam path 45), so that at least no more directed back-reflection of the ambient radiation 44 leaves the light trap 31 (at least in the direction of the light exit surface A).

Secondary radiation generated or created at the outcoupling apparatus of the light-guiding body 24 of the primary radiation emitted by the light-emitting diode and coupled into the light-guiding body is reflected here by the reflection surface of the second rear wall region (in the direction of the light-guiding body) (see secondary LED beam path 48) and/or is reflected and/or scattered in an upper region of the light trap or of the first rear wall region by a wall side 47 further away from the illuminant in the direction of the light exit surface A of the light-guiding body (illustrated by the beam path identified with reference numeral 46), so that this is not absorbed into secondary radiation 48 in the light trap but rather contributes to the increase in the light intensity and light yield of the light module 10.

Figure 2A:
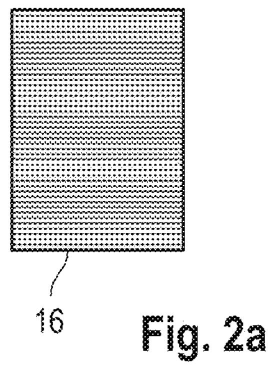
FIGS. 2*a*-2*b* show representations of a front view in each case of a rear wall apparatus of a light module in accordance with an embodiment.
Figure 2B:
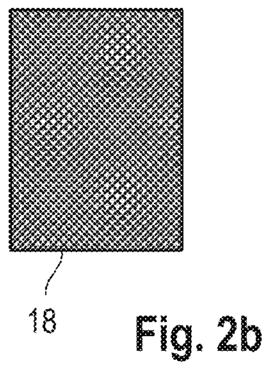

FIGS. 2*a* and 2*b* show representations of a front view in each case of a rear wall apparatus 16 and 18 of a light module 10 in accordance with an embodiment (wherein only the rear wall is depicted). A structured rear wall (having a beam trap) is in each case obvious here, wherein a plurality of first and second rear wall regions are each arranged periodically or regularly line by line (see FIG. 2*a*) and in a checkered manner.

In order to suppress the stray radiation or ambient radiation, it is therefore proposed that the (existing) rear wall is structured periodically so that a beam trap is created and external light is absorbed. This decreases or avoids the color desaturation of externally illuminated optical surfaces while at the same time fulfilling the desired light function in the best possible way.

It is possible to vary the structure size (for various embodiments of the rear wall). Furthermore, an additional absorbent coating and/or nanomaterials having an aligned structure may be applied.

The proposed configuration provides a scalable approach (area size of the rear wall) which simultaneously stands out due to the low production costs and suitability for high-volume production.

Figure 6:
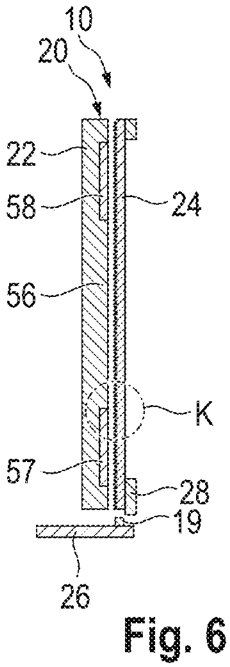
FIG. 6 shows a schematic cross-sectional representation of a light module according to a further embodiment.

FIG. 6 shows a schematic cross-sectional representation of a light module 10 according to a further embodiment, for example having a structured rear wall for a surface light guide 24. In the embodiment depicted here, a first rear wall region 56 consists of a first material which differs from a second material of the two second rear wall regions 57 and 58. In this case, the first material differs from the second material for example due to a scattering property (for example with regard to the ambient radiation which is for example light from the wavelength range of the daylight spectrum).

Figure 7:
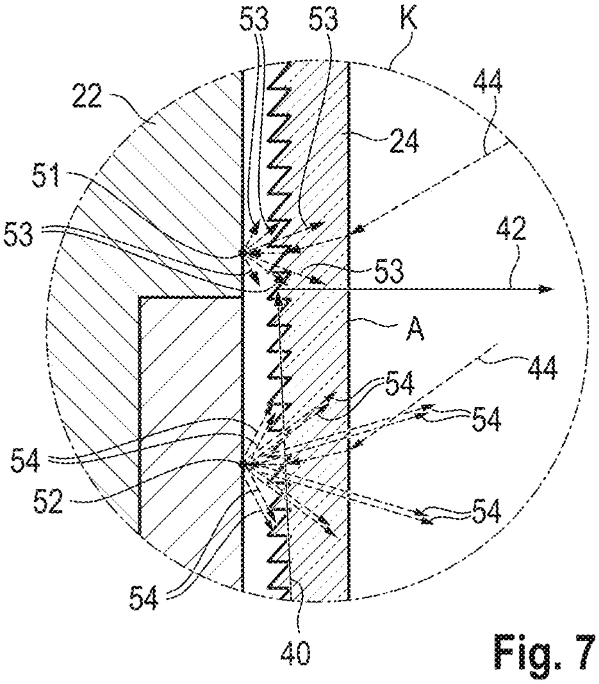
FIG. 7 shows a detailed representation of a cutout from the light module depicted in FIG. 6.

FIG. 7 shows a detailed representation of a cutout from the light module 10 depicted in FIG. 6. Due to the different scattering of the incident ambient radiation 44 at points 51 and 52, illustrated here by the scattered radiation identified by the reference numeral 53 as well as that identified by the reference numeral 54, a different scattering property existing at points 51 and 52 is illustrated.

Point 51 is a point of the first rear wall region 56 and point 52 is a point on the surface of the second rear wall region 57. Here, the material of the second rear wall region (at and around point 52) is suitable and destined for (comparatively) strong scattering, while the material of the first rear wall region is suitable and destined for a (comparatively) low scattering of the incident ambient radiation 44.

Figure 5A:
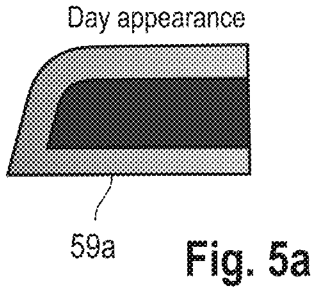
FIGS. 5*a, b* show a front view as well as the night appearance of a vehicle lamp according to a further embodiment.
Figure 5B:
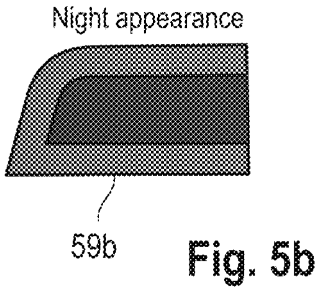

FIGS. 5*a* and 5*b* show a front view 59*a* as well as the night appearance 59*b* of the vehicle lamp (depicted in FIG. 5*a*) of a vehicle lamp according to a further embodiment. It is obvious that (precisely) one first rear wall region as well as (precisely) one second rear wall region are provided here, which form the rear wall to a light-guiding body. In this case, a (for example second) rear wall region extending along an edge region, in the night appearance (see FIG. 5*b*), brings about a higher light intensity of the radiation illuminated by the light module in this region than the further (for example first) rear wall region substantially located in a central region of the rear wall region which scatters a lower (relative) proportion of the radiation incident on it in the direction of the light exit surface A.

In the front view 61 of a vehicle lamp or light module configured in accordance with such an embodiment, a grating-shaped pattern having regions of lower intensity 61*a* and higher light intensity 61*b* is shown in accordance with the arrangement of the first and second rear wall regions. Similarly, a grating-shaped region 62*a* of lower intensity having grating hole-shaped regions 62*b* of higher light intensity is also produced in the night appearance.

Figure 8A:
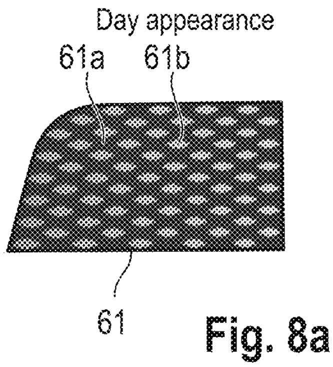
FIGS. 8*a*, 8*b* show a front view as well as the night appearance of a vehicle lamp according to a further embodiment.
Figure 8B:
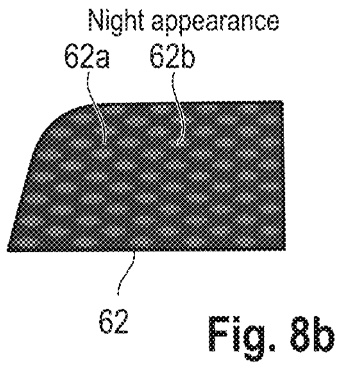

FIGS. 8*a*, 8*b*, 9 and 10 illustrate an embodiment of a light module or a structured rear wall for surface light guides in accordance with a further embodiment, in which a plurality of first rear wall regions 66 (having for example a material, for instance a dark and for example black colored material with low scattering) and a plurality of second rear wall regions 67 are provided, which configure a (for example grating-shaped) pattern (see FIGS. 8*a*, 8*b*).

Figure 9:
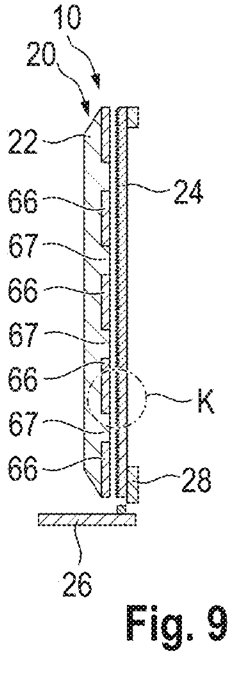
FIG. 9 shows a schematic cross-sectional representation of a light module according to a further embodiment.
Figure 11A:
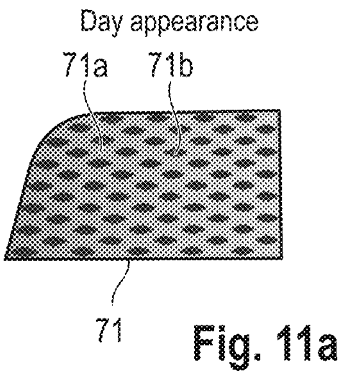
FIGS. 11*a*, 11*b* show a front view as well as the night appearance of a vehicle lamp according to a further embodiment.
Figure 11B:
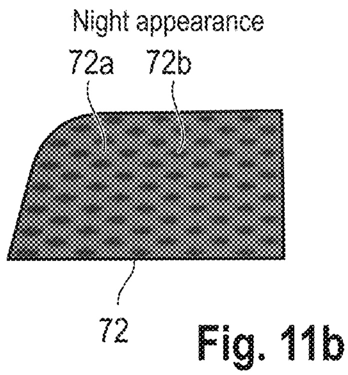
Figure 12:
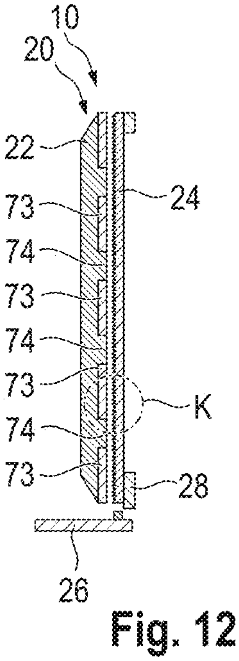
FIG. 12 shows a schematic cross-sectional representation of a light module according to a further embodiment.

FIGS. 11*a*, 11*b* and 12 illustrate an embodiment of a light module or a structured rear wall for surface light guides in accordance with yet another embodiment, in which, compared to the embodiment depicted in FIGS. 8*a*, 8*b* and 9, the rear wall or the rear wall apparatus 20 has an inverted pattern. Accordingly, the base body of the rear wall 22 here consists of dark and for example black colored material, which forms, on the surface thereof, the first rear wall regions 74, while a for example light material (for example white material) is arranged in recesses of said base body and accordingly configures a plurality of second rear wall regions 73.

Accordingly, the front view 71 and the night appearance 72 depicted in FIGS. 11*a* and 11*b* result in an inverted image compared to FIGS. 8*a* and 8*b*. Here, grating-shaped structures of high intensity 71*a* or 72*a* and intermediate grating hole-like regions 71*b* and 72 of low intensity are produced.

Figure 10:
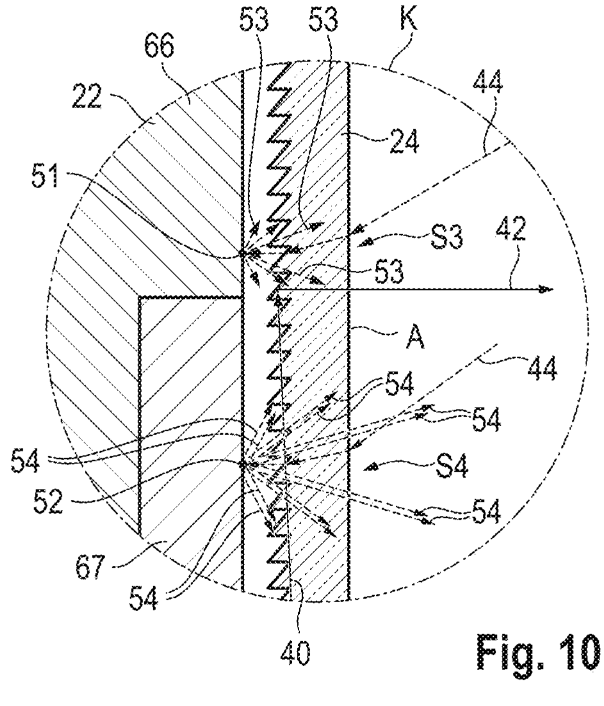
FIG. 10 shows a detailed representation of a cutout from the light module depicted in FIG. 9.
Figure 13:
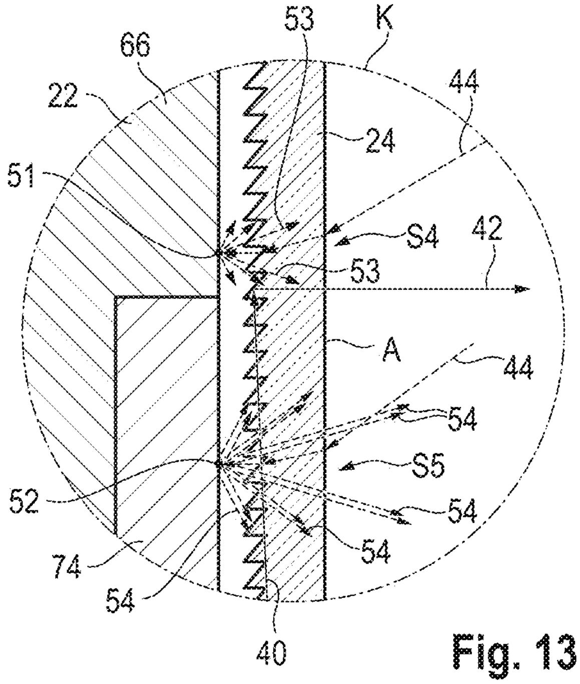
FIG. 13 shows a detailed representation of a cutout from the light module depicted in FIG. 12.

Similarly to FIG. 7, FIGS. 10 and 13 each show a detailed representation of a cutout from the light module 10 depicted in FIG. 9 or FIG. 12 in accordance with a further embodiment in each case. Reference is therefore made to FIG. 7 with regard to an explanation of these FIGS.

Figure 14:
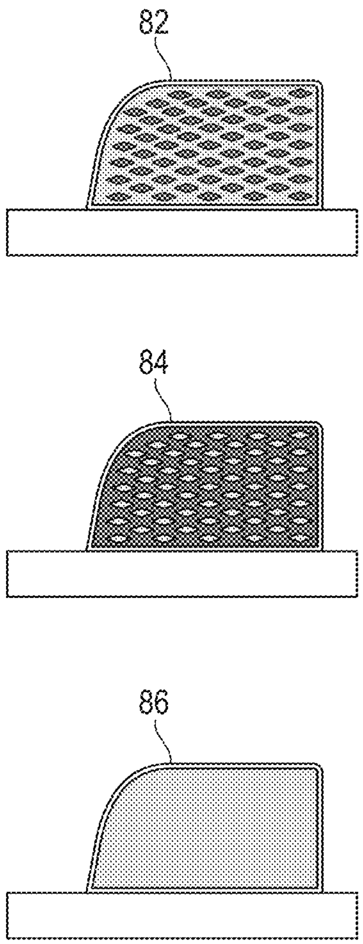
FIG. 14 shows three representations of a taillight having an implementation of a rear wall, each having a different pattern.
Figure 15:
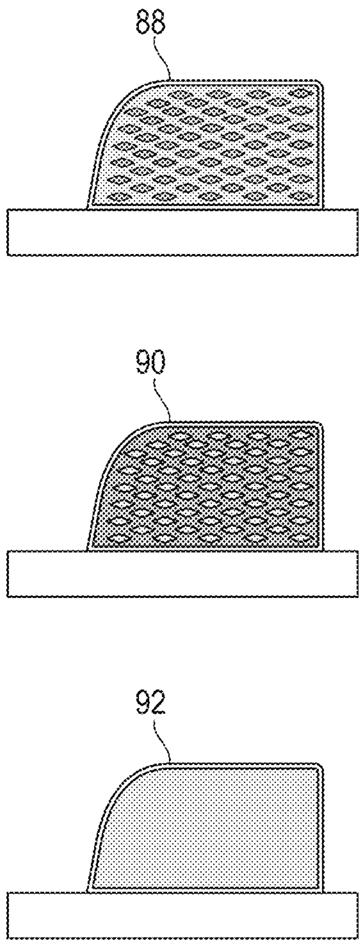
FIG. 15 shows three representations of a turn signal having an implementation of a rear wall, each having a different pattern.

FIGS. 14 and 15 each show three representations of a taillight (FIG. 14) or of a turn signal (FIG. 15) having an implementation of a rear wall having a different pattern in each case. The top FIGS. 82, 88 each depict a black and white pattern of the structured rear wall for a surface light guide, the respective middle FIGS. 84, 90 each have an inverted pattern compared to the top FIGS. 82, 88, that is to say a white and black pattern of the structured rear wall for the surface light guide and the lowest representations 86 and 92 each have a (purely) white rear wall. The taillight and the turn signal differ from one another due to their light function, for example due to the color value of the emitted (LED) radiation. Whilst the color of the taillight is red, the color of the emitted light or light (transmitted, emanating from the LED) of the turn signal is orange or yellow.

Figure 20:
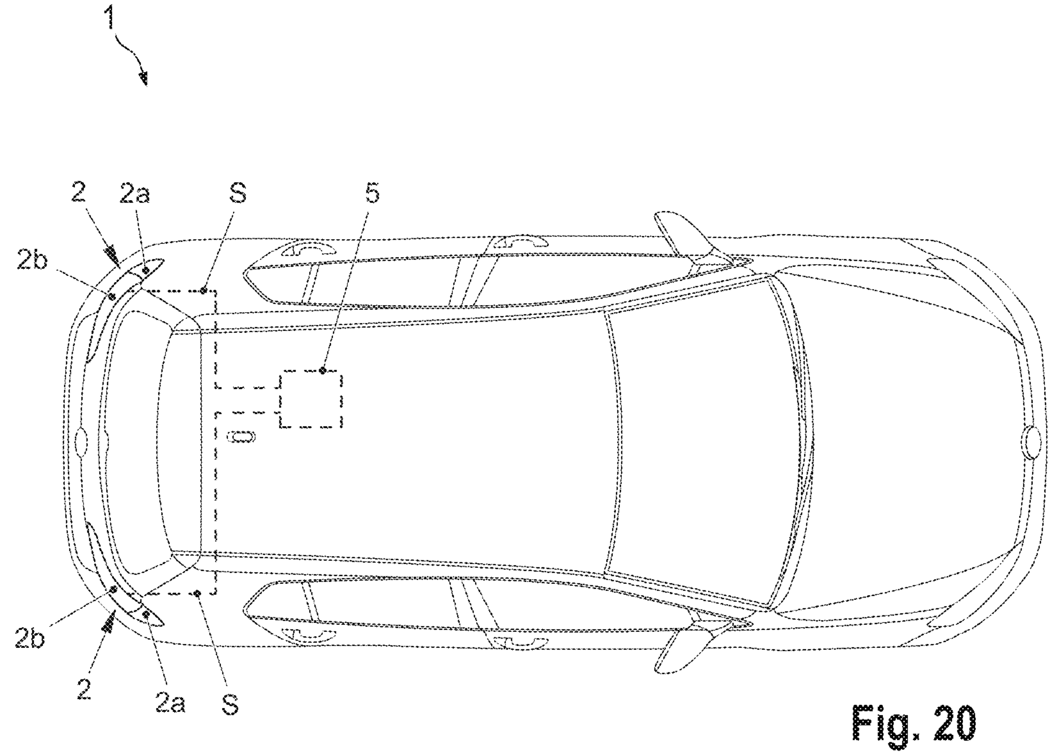
FIG. 20 shows a vehicle having a light module according to an embodiment.

FIG. 20 shows a vehicle 1 having two lighting devices 2, each of which has at least one light module 10, and which serve as rear lights. A control unit 5 is suitable and destined for actuating the lighting devices 2 via signal and control lines S. The reference numeral 2*a* identifies a body-mounted part of the lighting device and the reference numeral 2*b* identifies a tailgate-mounted part of the lighting device 2.

The applicant reserves the right to claim all the features disclosed in the application documents in so far as they are individually or in combination novel with respect to the prior art. Furthermore, it is pointed out that in the individual figures features were also described which may be beneficial per se. The person skilled in the art recognizes immediately that a specific feature described in a FIG. may also be beneficial without the incorporation of further features from this FIG. Furthermore, the person skilled in the art recognizes that benefits may also result from a combination of several features shown in individual FIGS. or in different FIGS.

LIST OF REFERENCE NUMERALS

1 Vehicle
2 Lighting device
Body-mounted part of the lighting
2*a* device
Tailgate-mounted part of the lighting
2*b* device
5 Control unit
10 Light module
12*a* Taillight
14 Turn indicator
19 Illuminant
16, 18, Rear wall apparatus 20
22 Rear wall
24 Light-guiding body
26 Printed circuit board
28 Diaphragm, frame
31 Beam trap
32 First rear wall region
34 Second rear wall region
40 Coupled-in radiation
42 Scattered primary radiation
44 Ambient radiation
Scattered/reflected secondary
46 radiation
45 Beam path
Wall side further away from
47 illuminant
48 Secondary radiation
51, 52 Points on surfaces of the rear wall
53, 54 Scattered radiation
56 First rear wall region
57, 58 Second rear wall region
59*a* Front view
59*b* Night appearance
61*a*, Region of lower intensity
62*a*
61*b*, Region of higher light intensity
62*b*
61, 71 Day appearance
62, 72 Night appearance
71*a*, Region of high intensity
72*a*
71*b*, Region of lower intensity
72*b*
66 First rear wall region
67 Second rear wall region
73 Second rear wall region
74 First rear wall region
94 LED spectrum
102 Color space
Superposition of LED spectrum and
104 daylight spectrum
96 White, diffuse lens
A Light exit surface
E Main extension plane
K Circle
M Central axis
LE Light emission
P1, P2 Arrows
S Signal and control line The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term " " used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A light module for a lighting device of a vehicle having:
at least one illuminant and a light-guiding body, which light-guiding body is configured to guide radiation emanating from the illuminant and coupled into the light-guiding body to a light exit surface of the light-guiding body, and having at least one rear wall apparatus which is arranged at least in certain areas in the beam path of ambient radiation incident from externally through the light exit side of the light-guiding body into the light-guiding body; wherein
the rear wall apparatus has at least one first rear wall region and at least one second rear wall region; wherein
the at least one first rear wall region and the at least one second rear wall region differ from one another in terms of reflection and/or absorption properties wherein
the at least one first rear wall region forms a light trap for ambient radiation only;
the light-guiding body is pane-shaped, wherein the extent of the light-guiding body in two spatial directions is substantially larger than in a third spatial direction; and wherein
the rear wall apparatus is arranged opposite the light-guiding body in such a way that radiation emanating from a rear side from the light-guiding body in the direction of the rear wall apparatus directly strikes the rear wall apparatus.

2. The light module of claim 1, wherein a material of the at least first rear wall region differs from a material of the at least second rear wall region in absorption properties and/or reflection properties.

3. The light module of claim 2, wherein a surface condition of the at least one first rear wall region differs from a surface condition of the at least second rear wall region.

4. The light module of claim 2, wherein the at least one first rear wall region differs at least in certain areas from the at least one second rear wall region due to a surface geometry, resulting in differing reflection and/or absorption properties.

5. The light module of claim 2, wherein a main extension direction of a portion of the first rear wall region with a main extension direction of the second rear wall region and/or with a main extension plane of a side of the rear wall apparatus facing the light-guiding body encloses an angle which differs from zero and, for example, an angle in a range between 20° and 80° therewith.

6. The light module of claim 1, wherein a surface condition of the at least one first rear wall region differs from a surface condition of the at least second rear wall region.

7. The light module of claim 6, wherein the at least one first rear wall region differs at least in certain areas from the at least one second rear wall region due to a surface geometry, resulting in differing reflection and/or absorption properties.

8. The light module of claim 6, wherein a main extension direction of a portion of the first rear wall region with a main extension direction of the second rear wall region and/or with a main extension plane of a side of the rear wall apparatus facing the light-guiding body encloses an angle which differs from zero.

9. The light module of claim 1, wherein the at least one first rear wall region differs at least in certain areas from the at least one second rear wall region due to a surface geometry, resulting in differing reflection and/or absorption properties.

10. The light module of claim 1, wherein a main extension direction of a portion of the first rear wall region with a main extension direction of the second rear wall region and/or with a main extension plane of a side of the rear wall apparatus facing the light-guiding body encloses an angle which differs from zero.

11. The light module of claim 1, wherein a main extension direction of the at least one first rear wall region runs diagonally to a main extension plane.

12. The light module of claim 1, wherein the at least one first rear wall region delimits at least in sections a cavity for example for receiving ambient radiation incident from externally through the light exit surface of the light-guiding body into the light-guiding body.

13. The light module of claim 1, wherein the at least second rear wall region has an absorbent coating at least in certain areas.

14. The light module of claim 1, wherein the at least second rear wall region has nanomaterials for absorbing incident ambient radiation.

15. The light module of claim 1, wherein the rear wall apparatus has a plurality of first rear wall regions and/or a plurality of second rear wall regions.

16. The light module of claim 15, wherein the plurality of first rear wall regions and/or the plurality of second rear wall regions is/are arranged periodically.

17. The light module of claim 16, wherein the plurality of first rear wall regions and/or the plurality of second rear wall regions is/are arranged in a strip-like or grid-like manner.

18. A vehicle having at least one lighting device of claim 1.

19. A method for reducing a color desaturation in a light module for a lighting device of a vehicle, which occurs under the influence of ambient radiation during the fulfilment of a light function using the light module; wherein, in order to fulfil the light function, the light module has at least one illuminant and a light-guiding body which is configured for guiding radiation emanating from the illuminant and coupled into the light-guiding body to a light exit surface of the light-guiding body, and having at least one rear wall apparatus which is arranged at least in certain areas in the beam path of ambient radiation incident from externally through the light exit surface of the light-guiding body into the light-guiding body; wherein the rear wall apparatus has at least one first rear wall region and at least one second rear wall region, wherein the ambient radiation is absorbed and/or reflected to varying degrees by the at least one first rear wall region and the at least one second rear wall region; wherein the at least one first rear wall region forms a light trap for ambient radiation only;

the light-guiding body is pane-shaped, wherein the extent of the light-guiding body in two spatial directions is substantially larger than in a third spatial direction; and wherein the rear wall apparatus is arranged opposite the light-guiding body in such a way that radiation emanating from a rear side from the light-guiding body in the direction of the rear wall apparatus directly strikes the rear wall apparatus.

* * * * *